Figure 1:
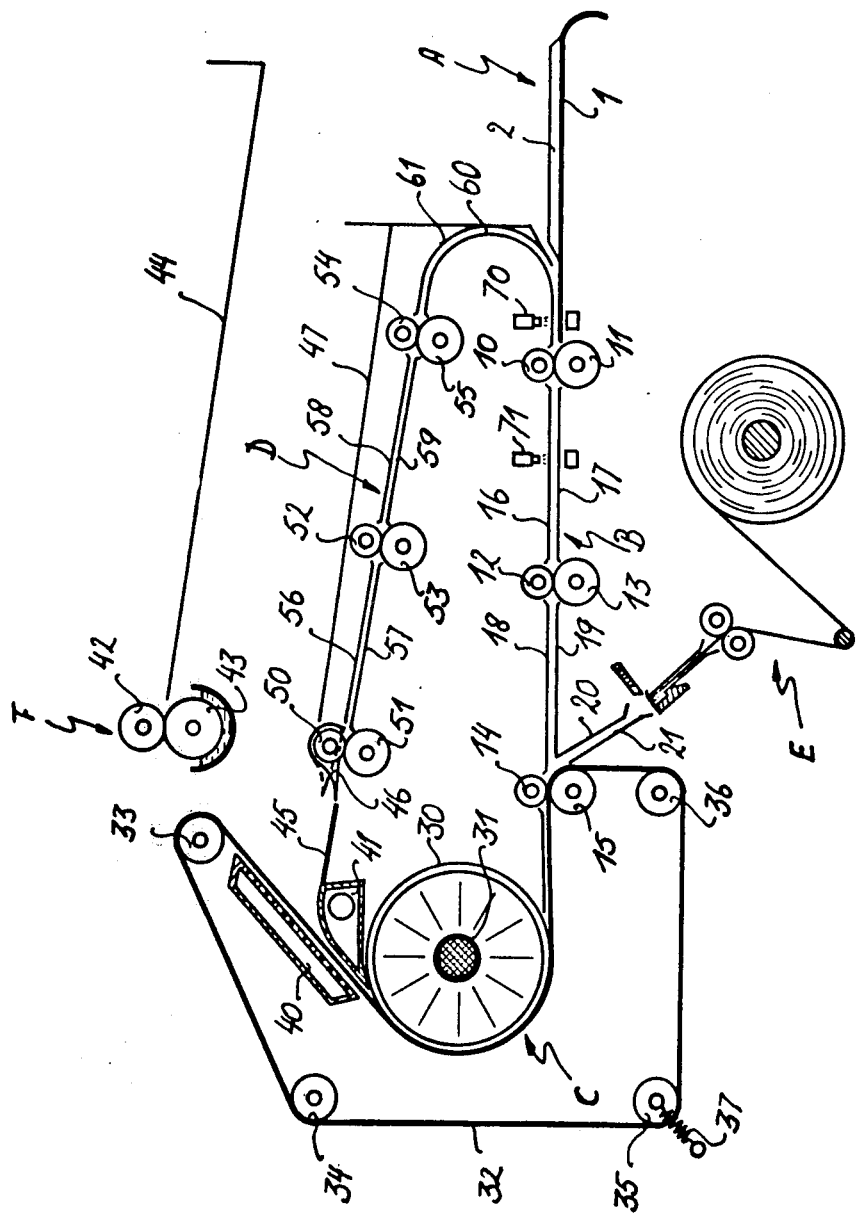

United States Patent [19]

Urselmann

[11] 4,058,359
[45] Nov. 15, 1977

[54] APPARATUS FOR COPYING SHEET ORIGINALS

[75] Inventor: Godefridus H. Urselmann, Venlo, Netherlands

[73] Assignee: Oce-van der Grinten N.V., Venlo, Netherlands

[21] Appl. No.: 437,152

[22] Filed: Jan. 28, 1974

[30] Foreign Application Priority Data

Jan. 29, 1973  Netherlands .......................... 7301199

[51] Int. Cl.² ............................................ G03B 27/12
[52] U.S. Cl. ....................................... 355/109; 355/95
[58] Field of Search ................. 355/95, 106, 109, 110; 226/20; 355/99, 100, 104

[56] References Cited

U.S. PATENT DOCUMENTS

| 2,786,675 | 3/1957 | Montefalco et al. ................... 226/20 |
| 2,927,210 | 3/1960 | O'Mara ............................. 355/106 X |
| 3,232,547 | 2/1966 | Thiede et al. ....................... 226/20 X |
| 3,368,726 | 2/1968 | Funk et al. ....................... 226/20 UX |
| 3,709,596 | 1/1973 | Ulmer ................................... 355/109 |
| 3,754,826 | 8/1973 | Kobayashi et al. .................. 355/109 |

Primary Examiner—Fred L. Braun
Attorney, Agent, or Firm—Albert C. Johnston; Gerard F. Dunne

[57] ABSTRACT

Copying apparatus of the type in which an original after being passed through a copying path with a copy sheet can be either delivered away or passed back through a return path into the copying path for making another copy is provided with a simple and reliable system for adjustably positioning a side edge of the original, even if it is fragile, relative to a side edge of the copy sheet so that the position of the images on multiple copies will not vary from copy to copy.

12 Claims, 4 Drawing Figures

APPARATUS FOR COPYING SHEET ORIGINALS

This invention relates to an apparatus for copying sheet shaped originals on copy sheets.

A type of copying apparatus is known in which an original sheet moved along a path from a feed station has one of its side edges regulated in position and direction in relation to the position and the direction of one side edge of the copy sheet, such apparatus comprising a first transport path including at least one pair of transport rollers, an exposing unit and a guide member that is adjustable to two positions determined by a counting device, so that in one position of the guide member the original is guided out of the apparatus and in the other position thereof the original is guided into a second transport path provided with driving means and along which the original is returned into the first transport path.

Such a device is described in the German patent application No. 2,220,397 and in the published German patent application No. 1,522,552.

When in such a device more copies have to be made from one original, the original is returned via the second transport path into the first transport path, until the desired quantity of copies has been made. During this transport of the original it occurs in practice that the original rotates out of position bout an axis perpendicular to the plane of the original, and/or that the original moves sidewards. This rotation and/or sideward movement is a result of inaccuracies in the construction of the device or in the original, which cannot be avoided in practice but can indeed be reduced to a fairly low value. Thus a sideward deviation of for instance 2 mm is rather normal. When a number of copies of one original is manufactured, this has as a consequence, that the position of the image on the copy sheet differs from copy to copy and that when a great number of copies is made of one original, the image of the original may partially or even completely fall out of the copy sheet.

Therefore it was proposed in the above-mentioned German patent application No. 2,220,397 to provide the second transport path with means to ensure, that the original is moved sideward until its side edge pushes against a lateral guide, which lateral guide corresponds with the desired position of the side edge of the original. However, the disadvantage of this is that the side edge is easily damaged and that the original risks being jammed or damaged irreparably. This risk is all the greater in proportion as the material of the original is less rigid, such as for instance in the case of transparent intermediates, especially when these are already torn, of airmail paper.

The object of the present invention is to provide an apparatus of the type mentioned in the opening paragraph, in which in a simple and reliable way a side edge of the original is kept adjusted to the desired position in relation to a side edge of the copy sheet.

Figure 2:
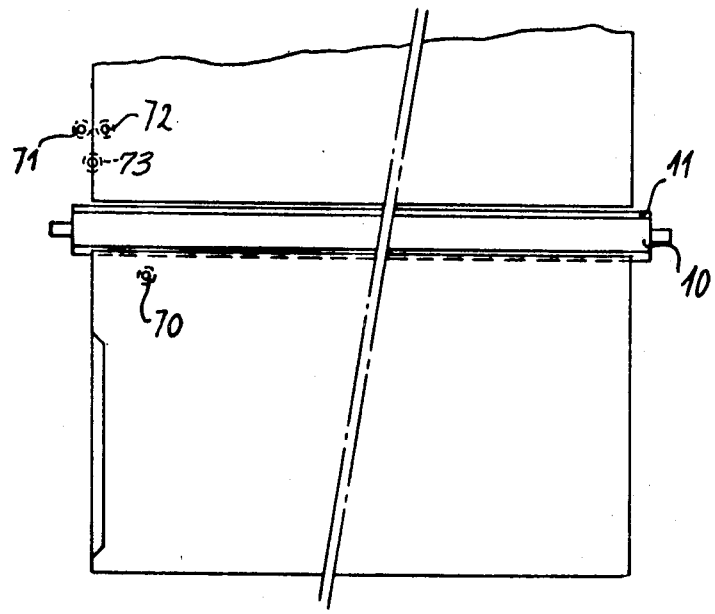
Figure 4:
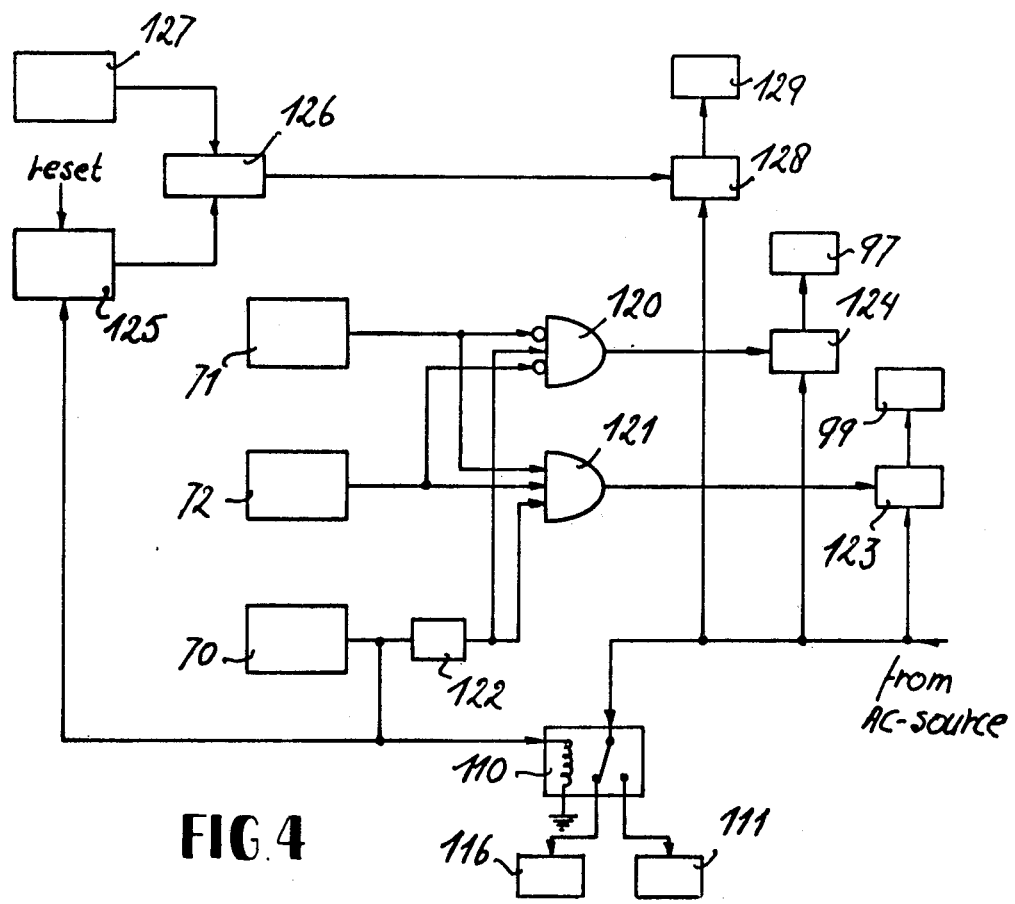
Figure 3:
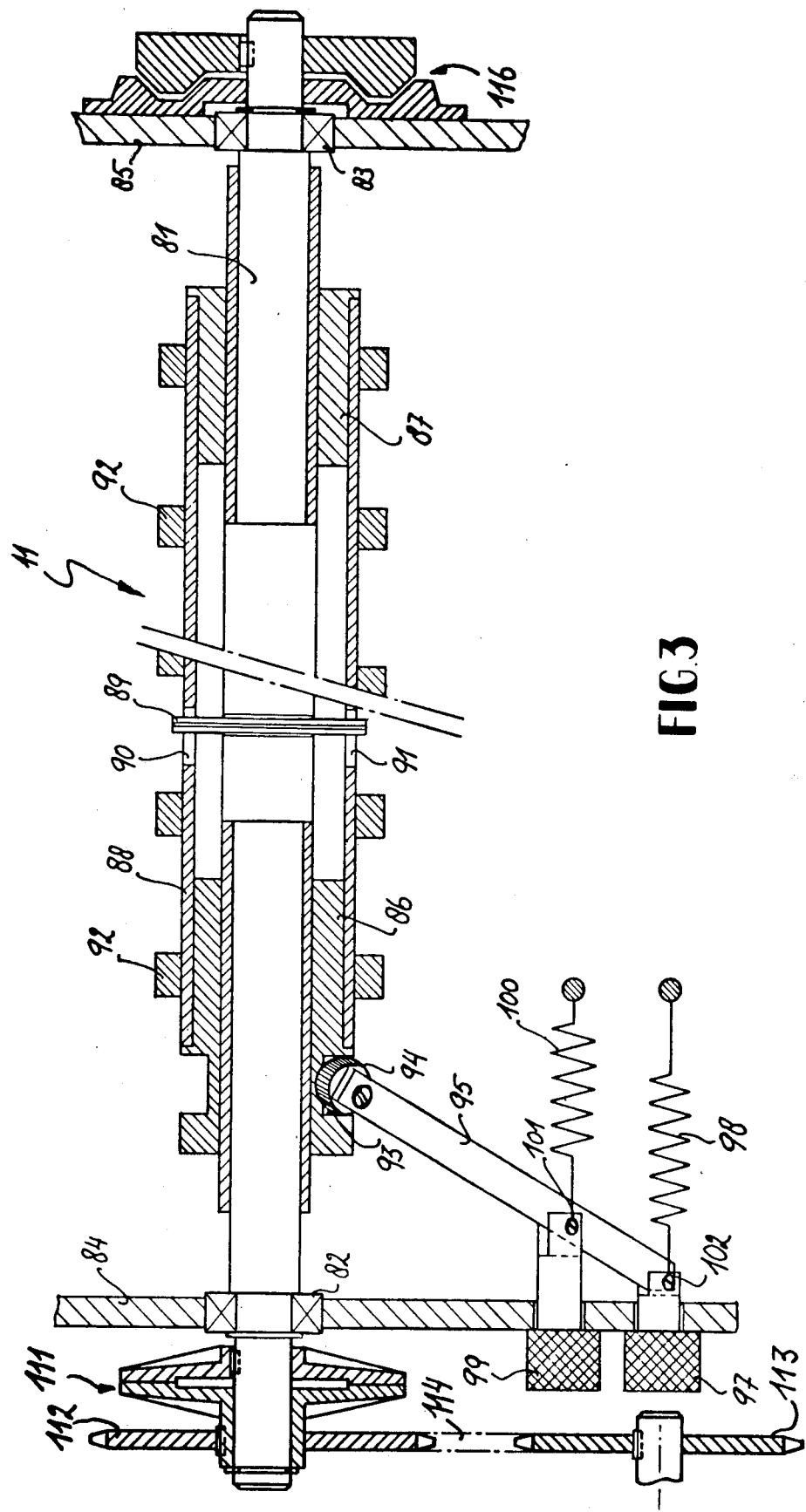

The object is attained according to the invention, in that in the path of the original between the guide organ and the first roller pair, in the direction of transport of the original, in the first transport path retaining organs are provided which can temporarily be activated and which force the side edge of the original into parallelism with the desired direction of its movement, in that said first roller pair in the first transport path can be moved axially, and in that means are provided for observing the deviation between a side edge of the original and the desired position of that side edge, which means command control organs controlling the axial movement of said roller pair. In this way it is achieved, that both the rotation and the sideward movement of the original are corrected in a simple and reliable way, without the edges of the original being subjected to increased wear. Other features and advantages will become clear from the following description, wherein reference is made to the accompanying drawings in which:

FIG. 1 is a schematic section of a photoprinting apparatus embodying the invention, FIG. 2 is a top plan view of a part of the first transport path for the original in the apparatus, FIG. 3 is an axial section of one of the rollers of the first roller pair in the first transport path of the apparatus and FIG. 4 is a schematic view of a control circuit for the apparatus.

The apparatus as schematically represented in FIG. 1 mainly consists of a feed section A for an original, a first transport path B for the transport of an original to an exposing section C, whereas before the original arrives into the exposing section C a copy sheet is supplied from a device E for the supply of copy sheets, which copy sheet is transported together with the original through the exposing section, and a second transport path D into which the original is brought by a guide organ still to be described and along which the original can be returned into the first transport path A. Further, there is a device F in which the copy sheet is further handled and conveyed out of the apparatus.

The feed section A for sheetlike originals consists of a feed table 1 with a lateral guide 2, of which the direction and the position have been chosen in such a way that when an original is fed into the apparatus with a side edge along the lateral guide 2, this side-edge will exactly coincide with a side edge of a copy-sheet which is supplied from the device E. From the feed section A the original arrives into the first transport path B, which in the represented embodiment of the apparatus comprises the roller pairs 10, 11, 12, 13 and 14, 15, together with upper and lower guides 16 and 17 respectively 18 and 19 which extend between the roller pairs 10, 11 and 12, 13 respectively between the roller pairs 12, 13 and 14, 15. These guides 16, 17, 18 and 19 may consist of plates, but preferably they are formed by a number of parallel rodlike organs.

A supply-path of a copy sheet, which supply-path is defined by two guide organs 20 and 21, ends in the first transport path for the original just ahead of the roller pair 14 and 15. The device E for the supply of a copy sheet is for instance of the type as described in Dutch Pat. No. 124,076, although other types can be used, for instance as described in Van der Grinten Bulletin No. 96, pages 1-e, or a sheet tray as described in Dutch patent application No. 72,05491. Further the first transport path contains detecting elements commonly known (not represented) which ensure that the supply of the copy sheet takes place in such a way that the leading edge of the original lies in register with the leading edge of the copy sheet.

Between the roller pair 14 and 15 the original is further transported, while in register with the copy sheet, to the exposing section C.

The exposing section C consists of an exposing cylinder 30, in which one or more tubular lamps 31 are installed. The construction and the form of such a cylinder 30 are generally known. An endless belt 32 or a number of endless bands is stretched around a part of the outer circumference of the cylinder 30 and is further stretched over rollers 33, 34, 35, 36 and the roller 15. At least one of the rollers 15, 33, 34, 35 and 36 can be caused to rotate by means of a non-represented driving mechanism, whereby the exposing cylinder 30 is caused to rotate as a result of the movement of the endless belt or bands. In order to tighten the endless belt or bands sufficiently, the extremities of a roller, for instance the roller 35, can be connected by means of pulling springs 37 to the frame of the apparatus. Further details with regard to the exposing section are for instance described in the above-mentioned German patent application No. 2,220,397.

The original together with the copy sheet is transported between the exposing cylinder 30 and the belt or bands 32, while an image of the original is projected on the light-sensitive layer of the copy sheet in order to form a latent image on this layer.

After the exposure the copy sheet is separated from the original, which separation is obtained in the embodiment represented by means of suction boxes 40 and 41, as generally known with this type of apparatus. The copy sheet is further transported together with the belt or bands 32 to a developing device F, comprising the rollers 42 and 43, with the roller 43 partially immersed into a developing liquid so that, when the copy sheet is conveyed through the nip between the rollers 42 and 43, a thin layer of developer is applied, which converts the latent image into a visible image. Subsequently the copy sheet arrives into a receiving-tray 44.

The original is further transported over a guide organ or a number of parallel guide organs 45 to a guide organ 46, which can occupy either of two positions, one being the position drawn in full lines, whereby the original is further transported to a receiving-tray 47, and the other being the position drawn in dotted lines, whereby the original is further transported to the second transport path D. The position of the guide organ 46 is controlled by means of an adjustable counting mechanism, by which the number of copies to be made of each original can be adjusted, and which at the same time registers the number of copies made of an original. The guide organ 46 is now controlled so that it occupies the position drawn in full lines when only one single copy is to be made of an original or when the last copy of a series of copies of one original is about to be made. In all other cases the guide organ 46 occupies the position drawn in dotted lines.

When the guide organ 46 occupies the position drawn in dotted lines, the original is further transported to the second transport path D. This comprises a number of roller pairs 50, 51; 52, 53 and 54, 55, together with guide-organs 56, 57 respectively 58, 59 which extend between the roller-pairs 50, 51 and 52, 53 respectively between 52, 53 and 54, 55.

Beyond the last roller pair 54, 55 in the second transport-path, as seen in the direction of movement of the original, two bent guide organs 60, 61 are provided, along which the original can be returned into the first transport path B.

As already explained above, the original may move in an undesired way during its transport, as a result of which the original and the copy sheet will no longer be exactly in register during the next exposure. These movements may involve a rotation of the original about an axis perpendicular to the plane of the original and/or an axial movement of the original. In order to correct these movements, the return path of the original consisting of the transport paths D and B is provided with a correction device which on the one hand corrects the rotation and on the other hand corrects the position of the original in cross direction. In the illustrated embodiment of the invention this correction device is formed by the roller pair 10, 11, in cooperation with detecting elements 70, 71 and 72 (see FIG. 2). The lower roller 11 (see FIG. 3) of the roller pair 10, 11 has a shaft 81 which by means of bearings 82, 83 is mounted in frame plates 84 and 85. The shaft 81 is driven by a not shown motor.

On the shaft 81 are slidingly mounted bearing-bushes 86 and 87, which support a cylindrical-tube 88 so, that the tube 88 can shift axially over the shaft 81. A pin 89, which is fixed in the shaft 81, extends in radial direction through axial openings 90, 91 in the tube 88, which openings are slot shaped, in order to transfer the rotation of the shaft 81 to the tube 88. On the tube 88 a number of rubber rings 92 are installed, on which the upper roller 10 rests as a result of its own weight. In the bearing bush 86 a circumferential groove 93 is made, in which a wheel 94 rests which is mounted in bearings so that it can rotate freely on one extremity of a lever 95. The other extremity of the lever 95 is rotatably connected with the movable core of a solenoid 97 and with a pulling spring 98, while the movable core of a solenoid 99 and the extremity of a pulling spring 100 are connected with a point of the lever between the two extremities. The other extremities of the pulling springs 98 and 100 are each connected with a fixation point on the frame of the apparatus.

When the solenoids 97 and 99 are excited, the cores are pulled into the coil with a force which is sufficient to overcome the pulling force of the springs 98 and 100. When the solenoid 97 is not excited, the core of this solenoid is pulled outwards by the pulling force exercised by the spring 98, so that the lever 95 starts rotating about hinge point 101, as a result of which the tube 88 is moved to the left as viewed in FIG. 3. When on the other hand the solenoid 99 is not excited, the pulling spring 100 will cause the lever-arm 95 to pivot about the hinge point 102, by which the tube 88 moves to the right as viewed in FIG. 3.

As represented in FIG. 2, the first transport path A for the original contains three detecting elements 70, 71 and 72, for instance photo-cells or microswitches viewed in the direction of transport of the original, the detecting element 70 is installed before the roller pair 10, 11 and the detecting elements 71 and 72 beyond the roller-pair 10, 11. The detecting elements 71 and 72 are installed at opposite sides of the desired position of the left side edge of the original.

As represented in FIG. 4, the detecting element 70 is connected in a control circuit which further includes a control element 110, such as an electromagnetic relay, in such a way that when the detecting element 70 senses the presence of the leading edge of the original, a signal is generated which via the control element 110 interrupts the current supply to an electromagnetic clutch 111 interposed between the shaft 81 and a gear wheel 112 which, via a gear-wheel 113 and a chain 114, is driven by the motor shaft 115. Simultaneously with the interruption of the clutch 111 the control element 110 energizes an electro-magnetic brake 116 on the shaft 81, as a result of which the rollers 10, 11 stop rotating. The control element 110 contains a time-switch which after a certain time again activates the clutch 111 and inactivates the brake 116.

When the rollers 10, 11 stop, the leading edge of the original is stopped in the nip between these rollers, and if the original has been rotated out of the desired position, its leading edge will exactly coincide with the contact line between the rollers 10 and 11, since the original is pressed in the direction of the nip by, for instance, the roller pair 54, 55 in the second transport path. In other words, the direction of the leading edge and thus also of the side edges of the original become parallel to the desired direction of these edges.

When subsequently the clutch 111 is reactivated by the time switch, the original is further transported in the desired orientation through the nip between the rollers 10, 11 and the sidewise position of the original in relation to the desired position of the original is determined by means of the detecting elements 71 and 72. These detecting elements are placed in such a way that the original occupies the exact position desired when the detecting element 71 is not operated and the detecting-element 72 is operated. When both of the detecting elements 71 and 72 are operated, the original is situated too far to the left, and when none of the detecting elements 71 and 72 is operated, the original is situated too far to the right. The detecting elements 71 and 72 together with the solenoids 97 and 99 are connected in the control circuit according to FIG. 4. This control circuit contains two gates 120 and 121 which each have three entries into which the signals generated by the detecting elements 70, 71 and 72 are transmitted. A signal generated by the element 70 is transmitted to the gates 120 and 121 via a time delay member 122, which has such a delay that the original will advance a distance equal to the distance between the detecting elements 70 and 71, 72 during the delay time. The gates 120 and 121 operate in such a way that when both the detecting element 71 and the element 72 are operated by the original they generate a signal which in cooperation with the delayed signal from element 70 opens the gate 121 while the gate 120 remains closed.

The signal transmitted by gate 121 interrupts via a control element 123 the excitation of the solenoid 99, so that the rollers 10, 11 are moved to the right. When none of the detecting elements 71 and 72 is operated by the original, the gate 120 is opened to transmit a signal which via a control element 124 interrupts the excitation of the solenoid 97, so that the rollers 10, 11 are moved to the left. The movement of the rollers 10, 11 results in a movement of the original into the exact direction desired, that is, the deviation between the desired position of the left side edge and the actual position of the side edge of the original is reduced.

As soon as the original has left the nip between the roller pair 10, 11, the solenoid which may have been switched off is again exited, by means of the delayed fall off of the signal generated by the detecting-element 70, as a result of the passage of the trailing edge of the original over the detecting element 70, so that the rollers 10, 11 again take up their normal position.

Upon each movement of an original entirely past element 70 the signal generated by the detecting element 70 also actuates a counter 125 which upon each actuation counts up and transmits a signal, according to the number of copies made, to a comparator 126. The comparator 126 compares the signal of the counter 125 with the signal generated by a setting member 127, which member can be set for the desired number of copies. Upon equality of both signals, the comparator 126 generates a signal which via a control element 128 interrupts the excitation of a solenoid 129. The guide organ 46 which is fitted to the solenoid 129 now takes up the position drawn in full lines in FIG. 1, after the last of the pre-set number of copies has been made by exposure in Section C, and transports the original to the receiving tray 47.

In the above-mentioned embodiment both a deviation to the left and a deviation to the right are sensed, and the correction then takes place with a constant movement. With most apparatus this is sufficient, on the condition that the movement of the roller pair to the left or to the right is at least equal to half of the distance between the detecting elements 71 and 72. Preferably the movement of the roller pair is also greater than the maximum deviation of the original during a copying run.

In practice it often is possible to obtain good results with only one detecting element 71 or 72. In apparatus of the same type it has appeared that the originals introduced always tend to become dislocated in the same direction, which is probably caused by the equality of construction deviations within the production-tolerances allowed. The detecting element and the pertaining solenoid, which must react upon a movement in the other direction, can be omitted in such cases. Of course it is also possible to introduce construction deviations of the above-mentioned kind intentionally.

However, for other apparatus, for instance system apparatus, the correction available from only one of the elements 71 and 72 may be insufficient, since the deviation allowed is equal to half of the distance between the detecting elements 71 and 72. If this distance is chosen too small, the movement of the rollers also has to be smaller, since this movement may not be greater than the distance between the detecting elements 71 and 72. This may mean that the movement of the rollers is smaller than the maximum deviation during a copying run.

In order to obtain small tolerances, the distance over which the rollers 10, 11 can be moved can be made adjustable. For this purpose, the direction of the movement of the roller pair 10, 11 is controlled by the detecting-elements 71 and 72 and the extent of the movement is controlled by means of, for instance, a further detecting element 73 which is placed opposite to the desired position of the side edge of the original, which detecting element stops the movement of the roller pair as soon as the side edge of the original has reached the desired position.

It is clear, that the invention is not restricted to the embodiment mentioned and represented above, but that numerous variations can be applied without deviating from the basic idea. For instance the device for correcting the orientation of the original can be formed not by the roller pair 10, 11, but by an arrest which is temporarily brought into the transport path of the original, the direction of that arrest being parallel to the desired direction of the edge which this arrest comes into contact or is brought into contact. This arrest can be arranged as a full plate or as a number of separate organs, for instance pins, which can be brought into the path of movement. Further, the invention is not restricted to a photo-printing apparatus, as described above, whereby the copy sheet is brought into contact with the original, but the invention can be applied to any type of reproduction apparatus, for instance a thermal-diazo-apparatus, a direct or indirect electrophotographic apparatus, etc., whereby from one sheetlike original multiple copies are to be made.

I claim:

1. In an apparatus for producing any number of copies of a sheet-shaped original fed thereinto, including (a) means for exposing the original with a copy sheet fed thereto; (b) means, including at least one pair of sheet feeding rollers, defining a first path for movement of the original to said exposing means; (c) a feed section for directing the original into said first path; (d) means for guiding a copy sheet in a path leading into said first path, for movement of the copy sheet to said exposing means with the original; (e) means defining a second path for movement of the original from said exposing means back into said first path; and (f) switching means operative in one position thereof to guide the original from said exposing means out of the apparatus, and operative in a second position thereof to guide said original into said second path; said second path and said first path together constituting a path of return movement of the original between said switching means and said exposing means; the combination which further comprises:
1. means operable to engage an edge of the original in said path of return movement for orienting the original so that a side edge thereof lies parallel to or in the direction required for alignment of said side edge with a side edge of a copy sheet guided in said copy sheet path;
2. means for displacing transversely of said first path the pair of said at least one pair of rollers that engages the original as it is moved into said first path;
3. means for sensing a lateral deviation between the actual location of a side edge of an original in said first path and the position thereof required for registration thereof with said side edge of said copy sheet; and
4. control means responsive to said sensing means to activate said roller displacing means so as to correct said lateral deviation.

2. Apparatus according to claim 1, said sensing means comprising a first sheet detecting element located adjacent to but laterally inside said required position of said side edge of the original and a second sheet detecting element located directly opposite said required position, said control means including means responsive to the absence of a sheet detection signal from said first element for activating said displacing means in the direction toward said required position and means responsive to a sheet detection signal from said second element for inactivating said displacing means.

3. Apparatus according to claim 2, said last mentioned pair of rollers being displaceable axially thereof by said displacing means, in either direction transversely of said first path over a distance at least as great as the distance between said first detecting element and said required position.

4. Apparatus according to claim 1, said sensing means comprising first and second sheet detecting elements adjacent to but, respectively, laterally outside and laterally inside said required position, said control means including means responsive to sheet detection signals from both of said elements for activating said displacing means in one direction and means responsive to an absence of such signals from both of said elements for activating said displacing means in the opposite direction.

5. Apparatus according to claim 4, said control means further including means for inactivating said displacing means in response to both the presence of a sheet detection signal from said second element and the absence of such a signal from said first element.

6. Apparatus according to claim 4, said sensing means further including a third sheet detecting element located directly opposite said required position of said side edge and said control means including means responsive to a sheet detection signal from said third element for inactivating said displacing means.

7. Apparatus according to claim 4, last mentioned pair of rollers being displaceable axially thereof by said displacing means, in either direction transversely of said first path, over a distance at least as great as half the distance between said first element and said second element.

8. Apparatus according to claim 1, said sensing means being located in a part of said first path downstream from said last mentioned pair of rollers.

9. Apparatus according to claim 1, said orienting means comprising roller surfaces converging to form the nip of a driven pair of rollers constituting part of said path defining means and means for interrupting the driving of said driven pair of rollers so that the leading edge of the original will be arrested by and positioned parallel to said roller surfaces.

10. Apparatus according to claim 9, said driven pair of rollers being the aforesaid pair of rollers that engages the original as it is moved into said first path.

11. Apparatus according to claim 1, further comprising in said combination a detecting element for sensing the leading edge of an original approaching said orienting means and means responsive to an edge sensing signal from said detecting element for temporarily activating said orienting means.

12. In an apparatus for producing any number of copies of a sheet-shaped original fed thereinto, including (a) means for exposing the original with a copy sheet fed thereto; (b) means, including at least one pair of sheet feeding rollers, defining a first path for movement of the original to said exposing means; (c) a feed section for directing the original into said first path; (d) means for guiding a copy sheet in a path leading into said first path, for movement of the copy sheet to said exposing means with the original; (e) means defining a second path for movement of the original from said exposing means back into said first path; and (f) switching means operative in one position thereof to guide the original from said exposing means out of the apparatus, and operative in a second position thereof to guide said original into said second path; said second path and said first path constituting a path of return movement of the original between said switching means and said exposing means; the combustion which further comprises:
1. the pair of said at least one pair of rollers that engages the original as it is moved into said first path being driven rollers that extend transversely of said path and are displaceable axially, and through the nip of which the original will be advanced by their rotation;
2. means for displacing said driven rollers axially thereof;
3. a detecting element for sensing the leading edge of the original as it approaches said driven rollers;
4. means responsive to an edge sensing signal from said detecting element for temporarily interrupting the rotation of said driven rollers so that said leading edge will be arrested by and positioned parallel to said nip;

5. means, including a plurality of sheet detecting elements located in said first path downstream from said driven rollers, for sensing a lateral deviation between the actual location of a side edge of the original and the position thereof required for registration thereof with a side edge of a copy sheet guided in said copy sheet path, at least one of said detecting elements being located at either side of said required position; and 6. control means responsive to signals from said sheet detecting elements for activating said displacing means to displace said driven rollers axially so as to correct said lateral deviation.

* * * * *

UNITED STATES PATENT OFFICE
CERTIFICATE OF CORRECTION

Patent No. 4,058,359          Dated November 15, 1977

Inventor(s) Godefridus H. Urselmann

It is certified that error appears in the above-identified patent and that said Letters Patent are hereby corrected as shown below:

Col. 1, line 28; read "about" in place of "bout";

line 52; insert "or" before "of";

Col. 2, line 55; in place of "1-e" read "1-5";

Col. 6, line 59; after "edge" insert "with";

Col. 8, line 12: insert "said" before "last";

line 55: in place of "combustion" read "combination".

Signed and Sealed this

Eighteenth Day of July 1978

[SEAL]

Attest:

RUTH C. MASON
Attesting Officer

DONALD W. BANNER
Commissioner of Patents and Trademarks